No. 12,706. REISSUED OCT. 22, 1907.

W. PERSON.

AUTOMATIC LIFT AND DROP SEWING MACHINE CABINET.

APPLICATION FILED MAR. 22, 1907.

Witnesses:
Harold G. Barnett
Louis B. Erwin

Inventor:
William Person
By Preston Harrison & Davis
His Attys

THE NORRIS PETERS CO., WASHINGTON, D. C.

UNITED STATES PATENT OFFICE.

WILLIAM PERSON, OF ROCKFORD, ILLINOIS, ASSIGNOR, BY DIRECT AND MESNE ASSIGNMENTS, TO THE DAVIS SEWING MACHINE COMPANY, OF DAYTON, OHIO, A CORPORATION OF OHIO.

AUTOMATIC LIFT AND DROP SEWING-MACHINE CABINET.

No. 12,706. Specification of Reissued Letters Patent. Reissued Oct. 22, 1907.

Original No. 798,698, dated September 5, 1905, Serial No. 246,793. Application for reissue filed March 22, 1907. Serial No. 363,995.

*To all whom it may concern:*

Be it known that I, WILLIAM PERSON, a citizen of the United States, residing at Rockford, in the county of Winnebago and State of Illinois, have invented certain new and useful Improvements in Automatic Lift and Drop Sewing-Machine Cabinets, of which the following is a specification.

One object of the invention is to make the lifting of the machine-head easier through the employment of toggle links connecting the hinged head-supporting platform with the stationary frame-work, at the same time providing for solidly supporting said platform when raised, suitable operating connections being provided between the swinging cover or lid of the machine and the toggle links, so that when such cover is swung back it can act through a powerful leverage to raise the hinged platform and the machine-head upon it and the latter will be firmly supported at each side.

Another object of the invention is to provide for transmitting movement from the hinged lid or cover to the toggle links so as to permit movement of a chain or other flexible connection up and down in a substantially vertical plane, and hence obviate cramping thereof on a sheave or pulley over which such chain passes.

With these and incidental objects in view the invention consists in certain novel features of construction and combinations of parts, the essential elements whereof are recited in the appended claims and a preferred form of embodiment of which is described in detail hereinafter and fully illustrated in the accompanying drawings forming part of this specification.

Figure 1:
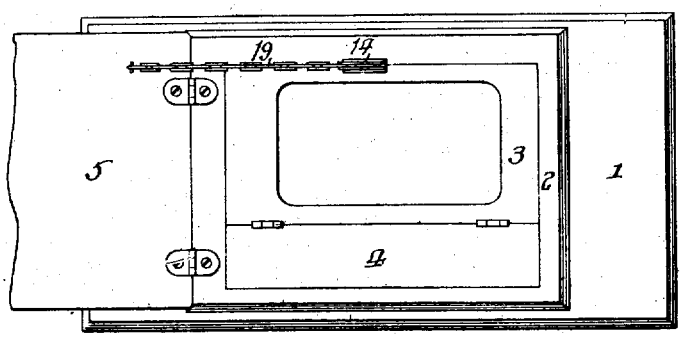
Figure 2:
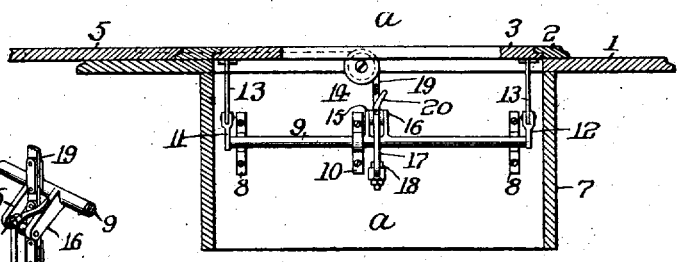
Figure 5:
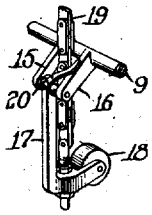
Figure 3:
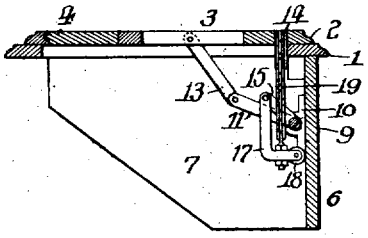
Figure 4:
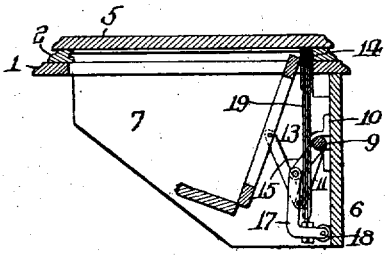

In the accompanying drawings which illustrate a preferred form of embodiment of the invention Figure 1 represents a sewing machine cabinet in top plan view with the present invention applied thereto and the hinged lid or cover thrown back; Fig. 2 represents a longitudinal section of the same parts; Fig. 3 represents a cross-section with the hinged lid or cover thrown back; Fig. 4 is a similar cross-section with the lid or cover down; and Fig. 5 is a perspective view of certain of the working parts of the improved mechanism.

The reference numeral 1 designates the usual open-center sewing machine top or table; 2 the rectangular open-center frame secured on top of the same; 3 the open-center platform which supports the machine-head and is hinged at the rear to the frame 2 and table 1; 4 the extension of said platform which is hinged to the latter; 5 the lid or cover which is hinged to one side of the frame 2; 6 the back-board of the cabinet; and 7 the sides of the latter.

According to the present invention the automatic raising and lowering of the machine-head platform is brought about through the medium of toggle links connected with the opposite ends of the platform and with the back part of the cabinet. These toggle links comprise members 13 pivoted to the middle portions of the ends of the platform and members 11 and 12 pivoted to the members 13 and pivotally mounted upon the back 6 of the cabinet. This pivotal mounting of the members 11 and 12 is preferably effected through the medium of a rock-rod or shaft 9 to which said members are rigidly secured and from which they project as crank arms. Said rock-rod is preferably mounted in open bearings 8 secured to the cabinet-back 6 at opposite sides of the same whereby the end portions of the rod are properly supported and arranged to turn. At or near the middle of its length this rock-rod is engaged with a closed bearing 10 also secured to the cabinet-back 6.

It will be seen that the above-described toggle links are adapted to support the platform 3 in its elevated position as illustrated in Fig. 3 and at the same time will permit said platform to be lowered as illustrated in Fig. 4. It will also be apparent that the turning of the rock-rod 9 to which the toggle link members 11 and 12 are secured will result in the toggle links being straightened sufficiently to elevate the platform. These toggle links are so connected with the hinged lid or cover 5 that the act of throwing back this lid or cover will operate to straighten the toggle links and it will be seen that this character of means for lifting the platform will have the advantage of presenting powerful leverage which will make the action easy. Then by locating the toggle links at opposite sides of the platform and connecting them with the ends thereof respectively, as described, the platform will be solidly supported with no possibility of its yielding to downward pressure through any tendency to tilt.

The working of the toggle links is in the present instance brought about through the medium of the rock-rod 9 and a depending arm or bar 17 designed to run against the back of the cabinet, this depending arm or bar having adjustably connected to its rearwardly turned end a chain 19. The latter runs up and over a sheave or pulley 14 rotatably secured against the rear portion of the table 1 and frame 2, said chain thence extending to the hinged lid or cover 5 to which it is attached. The depending arm or bar 17 is preferably jointed to a pair of arms 15 and 16 projecting from the middle portion of the rock-rod 9 adjacent the bearing 10. The extremity of the rearwardly turned lower end of the depending arm or bar 17 is bifurcated to accommodate a roller 18 adapted to run against the inner surface of the cabinet-back 6.

It will be seen that the above-described character of means for working the toggle links provides for maintaining the chain 19 in a vertical plane as the roller 18 travels up and down the back of the cabinet. The effect of drawing on the chain by the throwing back of the hinged cover or lid is to lift the bar 17, rock the rod 9 and work the toggle links in the manner before described. The connection of the chain with said bar being in rear of the latter's pivot the roller 18 will be held against the cabinet-back so that the chain maintains its proper relation to the roller 14 and there is no chance of the bar's swinging forward instead of rising.

In order to insure the continued engagement of the roller 18 with the cabinet-back notwithstanding slack in the chain as might exist with the hinged cover or lid down, a spring 20 is secured to the upper end of the bar 17 and bears against the arm 16 with a tendency to force the bar 17 rearwardly. It will of course be understood that the roller 18 is not essential and that the end of the bar might run against the cabinet-back without the interposition of any such roller.

It will be obvious that variations might be made in the construction shown without departing from the scope of the invention, as for instance in the manner of connecting the lifting arm and toggle joint or joints.

What is claimed is:

1. The combination with the body, hinged lid, and hinged platform or table of an automatic lift and drop sewing machine cabinet; of a toggle joint connecting the back of the body and platform, an arm connected with the toggle joint and adapted to travel up and down against the back of the body, and an operating connection between said arm and the hinged lid.

2. The combination with the body, hinged lid, and hinged platform or table of an automatic lift and drop sewing machine cabinet; of a toggle joint connecting the back of the body and the platform, an arm connected with the toggle joint and adapted to travel up and down against the back of the body, and an operating connection between said arm and the hinged lid, comprising a chain or cord and a sheave or pulley.

3. The combination with the body, hinged lid, and hinged platform or table of an automatic lift and drop sewing machine cabinet; toggle links connecting the opposite sides of the platform with the back of the cabinet body and operatively connected together, an arm connected with the toggle links and adapted to run up and down against the said cabinet back, and an operating connection between said arm and the hinged lid.

4. The combination with the body, hinged lid, and hinged platform or table of an automatic lift and drop sewing machine cabinet; toggle links connecting the opposite sides of the platform with the back of the cabinet body and operatively connected together, an arm connected with the toggle links and adapted to run up and down against the said cabinet back, and an operating connection between said arm and the hinged lid comprising a chain or cord and a sheave or pulley.

5. In a sewing machine cabinet, the combination of a top, a platform hinged to the top, a hinged cover, a rod pivotally supported by the cabinet beneath the top, a linked connection between the rod and platform, an arm having a pivotal connection with the rod and having a portion bearing against the cabinet and a connection between the arm and cover.

6. In a sewing machine cabinet, the combination of a top, a platform hinged to the top, a hinged cover, a rod pivotally supported by the cabinet beneath the top, a linked connection between the rod and platform, an arm supporting a roller, the roller bearing against the back of the cabinet, the arm pivotally connected to the rod, and a flexible connection between the arm and cover.

7. In a sewing machine cabinet, the combination of a top, a platform hinged to the top, a hinged cover, a rod pivotally supported by the cabinet beneath the top, a linked connection between the rod and platform, an arm supporting a roller, the roller bearing against the back of the cabinet, the arm pivotally connected to the rod, a flexible connection between the arm and cover, and a spring acting to hold the roller in contact with the cabinet-back when the cover is closed.

8. In a sewing machine cabinet, the combination of a top, a platform hinged to the top, a hinged cover, a rod pivotally supported by the cabinet beneath the top, a linked connection between the rod and platform, an arm extending from the rod, an arm pivotally connected to the arm extending from the rod and having a portion bearing against the cabinet, and a connection between the pivoted arm and cover.

9. In a sewing machine cabinet, the combination of a top, a platform hinged to the top, a hinged cover, a rod pivotally supported by the cabinet beneath the top, a linked connection between the rod and platform, an arm extending from the rod, an arm pivotally connected to the arm extending from the rod and supporting a roller bearing against the cabinet, and a connection between the pivoted arm and the cover.

10. In a sewing machine cabinet, the combination of a top, a platform hinged to the top, a hinged cover, a rod pivotally supported by the cabinet beneath the top, a linked connection between the rod and platform, an arm extending from the rod, an arm pivotally connected to the arm extending from the rod and having a portion bearing against the cabinet, a spring connected to the pivoted arm and exerting its force against the arm extending from the rod, and a connection between the pivoted arm and the cover.

WILLIAM PERSON.

Witnesses:
R. E. HAUTER,
F. P. DAVIS.